(12) United States Patent
Shinagawa

(10) Patent No.: US 11,453,119 B2
(45) Date of Patent: Sep. 27, 2022

(54) ROBOT ARM DRIVING UNIT

(71) Applicant: FANUC CORPORATION, Yamanashi (JP)

(72) Inventor: Masahide Shinagawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 1 day.

(21) Appl. No.: 17/077,235

(22) Filed: Oct. 22, 2020

(65) Prior Publication Data

US 2021/0162587 A1    Jun. 3, 2021

(30) Foreign Application Priority Data

Nov. 29, 2019  (JP) .............................. JP2019-216658

(51) Int. Cl.
*B25J 9/10* (2006.01)

(52) U.S. Cl.
CPC ............... *B25J 9/104* (2013.01); *B25J 9/102* (2013.01)

(58) Field of Classification Search
CPC ........ B25J 17/02; B25J 17/0241; B25J 9/102; B25J 9/104
See application file for complete search history.

(56) References Cited

U.S. PATENT DOCUMENTS 6,250,174 B1    6/2001    Terada et al.

FOREIGN PATENT DOCUMENTS

| EP | 0082386 A1 * | 6/1983 | ............... B25J 9/12 |
| EP | 0 891 842 A1 | 1/1999 | |
| JP | H02-303791 A | 12/1990 | |
| JP | H10-175188 A | 6/1998 | |
| JP | 2004-351590 A | 12/2004 | |
| JP | 2009-107116 A | 5/2009 | |
| JP | 4763063 B2 | 8/2011 | |
| WO | WO-2012010256 A1 * | 1/2012 | ............. F16D 65/28 |

* cited by examiner

*Primary Examiner* — Randell J Krug
(74) *Attorney, Agent, or Firm* — Maier & Maier, PLLC

(57) ABSTRACT

A driving-unit that rotates a first-member and a second-member constituting a robot-arm about a rotary-axis. The driving-unit includes: a bracket fixed to the first-member and including a first-hollow-hole penetrating along the rotary-axis; a motor fixed to the bracket and accommodated in the first-member; a reducer that connects the bracket and the second-member rotatable about the rotary-axis and that includes a second-hollow-hole penetrating along the rotary-axis; and a driving power transmission mechanism accommodated in the bracket and transmitting a rotation of the motor to the reducer. The driving power transmission mechanism includes a driving-shaft, a first-transmission-mechanism that transmits the rotation of the motor to the driving-shaft, and a second-transmission-mechanism that transmits a rotation of the driving-shaft to an input-shaft of the reducer. A distance between a shaft of the motor and the rotary-axis is shorter than a distance between the driving-shaft and the rotary-axis.

6 Claims, 6 Drawing Sheets

ROBOT ARM DRIVING UNIT

CROSS-REFERENCE TO RELATED APPLICATIONS

This application is based on Japanese Patent Application No. 2019-216658, the contents of which are incorporated herein by reference.

FIELD

The present disclosure relates to a robot arm driving unit.

BACKGROUND

There is a known robot driving unit in which a hollow reducer and a motor that includes a driving gear meshing with a center gear disposed at the center of the reducer are attached to a housing (see, for example, Publication of Japanese Patent No. 4763063). This driving unit drives a revolving barrel with respect to a base installed on a floor surface.

SUMMARY

One aspect of the present disclosure is a driving unit that rotates a hollow first member and a hollow second member constituting a robot arm relative to each other about a prescribed rotary axis, the driving unit including: a bracket fixed to the first member and including a first hollow hole penetrating along the rotary axis; a motor fixed to the bracket and accommodated in the first member; a reducer that connects the bracket and the second member such that the bracket and the second member are rotatable about the rotary axis and that includes a second hollow hole penetrating along the rotary axis; and a driving power transmission mechanism accommodated in the bracket and transmitting a rotation of the motor to the reducer, wherein the driving power transmission mechanism includes a driving shaft, a first transmission mechanism that transmits the rotation of the motor to the driving shaft, and a second transmission mechanism that transmits a rotation of the driving shaft to an input shaft of the reducer, and a distance between a shaft of the motor and the rotary axis is shorter than a distance between the driving shaft and the rotary axis.

DETAILED DESCRIPTION OF EMBODIMENT

Figure 1:
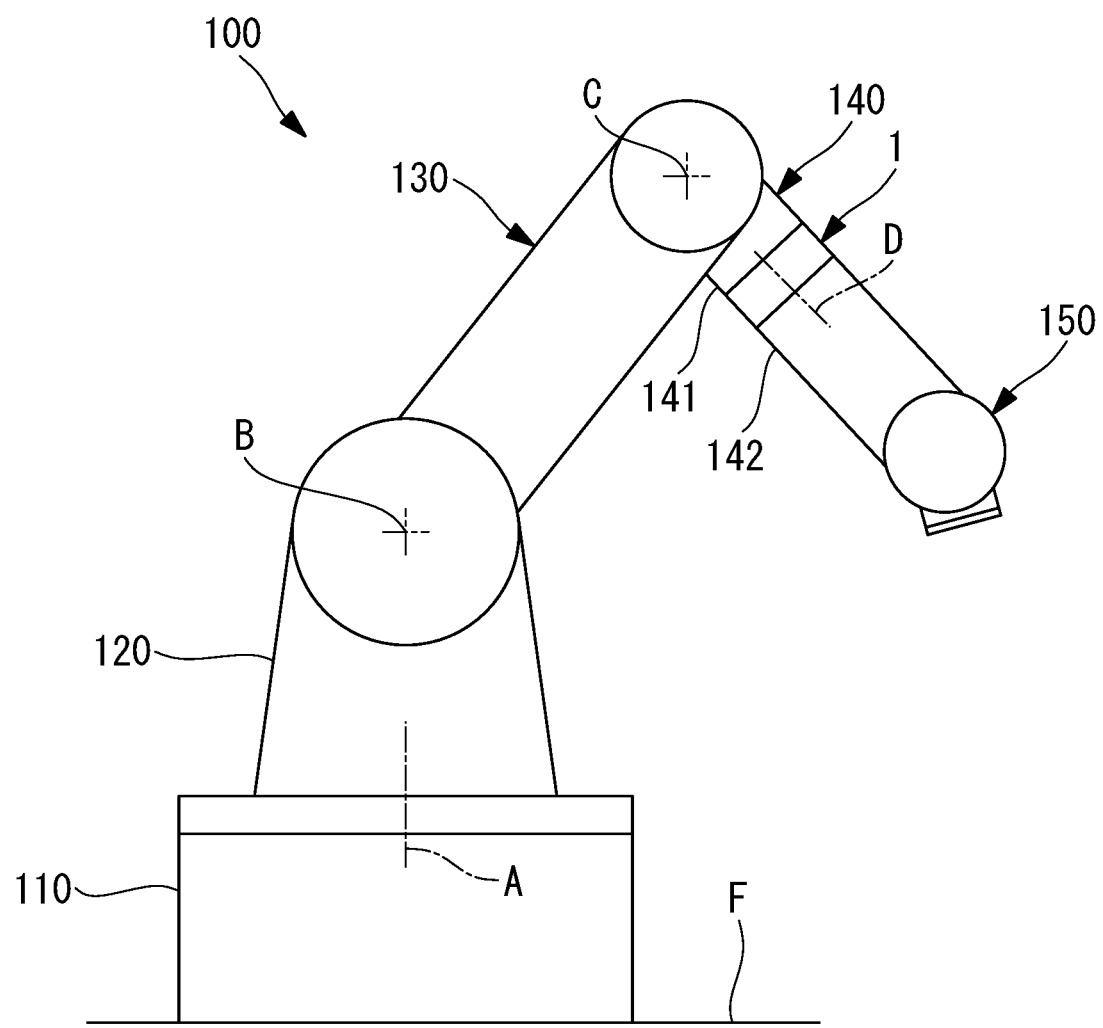
FIG. 1 is a schematic diagram illustrating a robot to which a robot arm driving unit an embodiment of the present disclosure is applied.

A robot arm driving unit 1 according to an embodiment of the present invention will be described below with reference to the drawings. A robot 100 equipped with the driving unit 1 according to this embodiment is, for example, a six-axis vertical articulated robot as shown in FIG. 1, and is provided with a base 110 installed on a floor surface F and a revolving barrel 120 supported so as to be rotatable with respect to the base 110 about a vertical first axis A.

The robot 100 is provided with a first arm 130 supported so as to be rotatable with respect to the revolving barrel 120 about a horizontal second axis B, and a second arm 140 supported so as to be rotatable with respect to the first arm 130 about a horizontal third axis C. The second arm 140 of the robot 100 is provided with a three-axis wrist unit 150.

A robot arm to which the driving unit 1 according to this embodiment is applied is the second arm 140, and a joint shaft driven by the driving unit 1 is a first wrist shaft at the most basal end of the wrist unit 150. The second arm 140 is provided with a second arm base part (second member) 141 and a first wrist shaft casing (first member) 142, as shown in FIG. 1.

The driving unit 1 connects the first wrist shaft casing 142 to the second arm base part 141 so as to be rotatable about a fourth axis D. The second arm base part 141 and the first wrist shaft casing 142 are respectively formed in a cylindrical shape having substantially the same outer diameter dimension as the outer diameter dimension of a reducer 3, which will be described later, and are disposed such that a central axis E is coincident with the fourth axis D.

Figure 2:
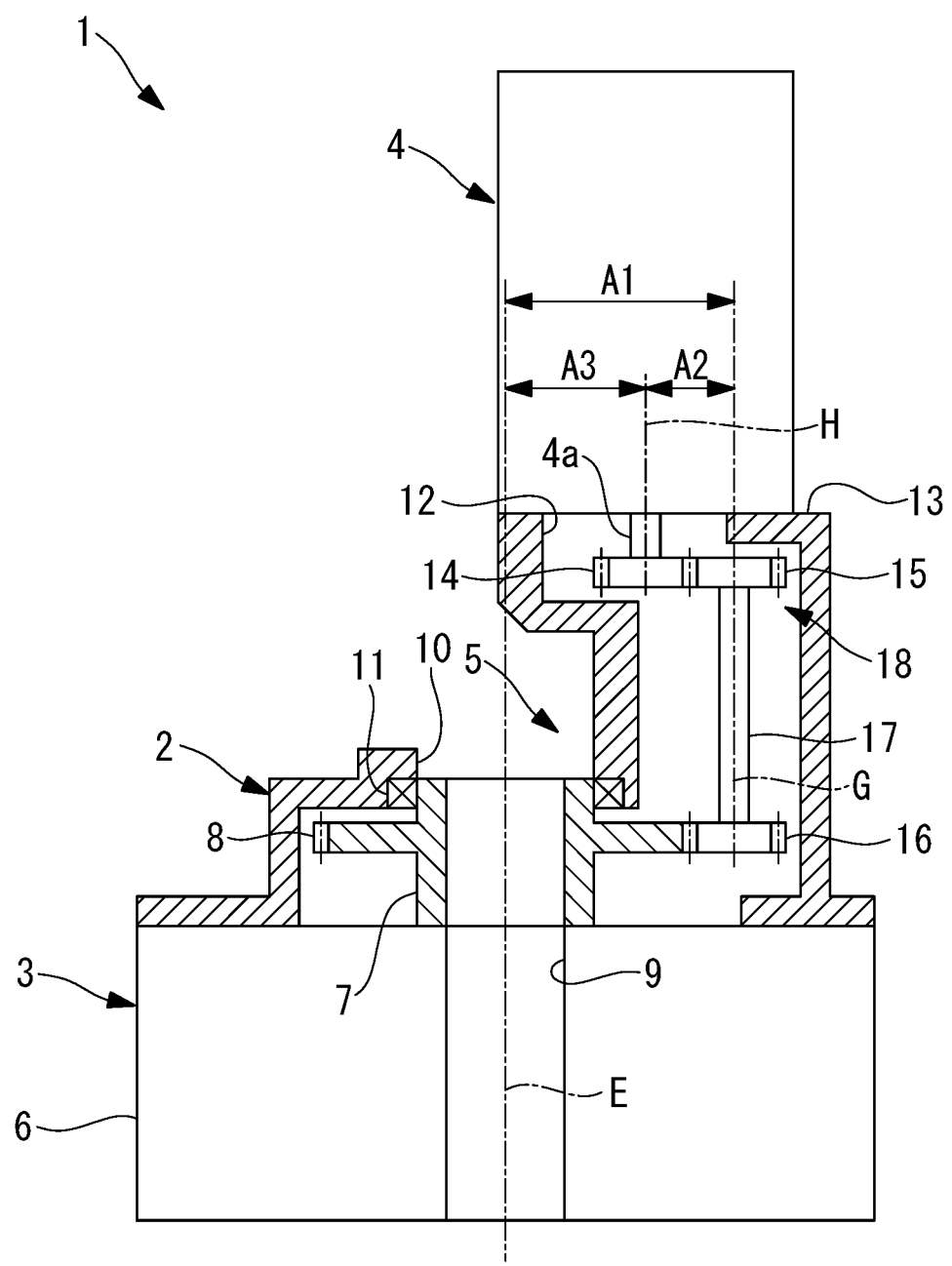
FIG. 2 is a vertical sectional view illustrating the driving unit in FIG. 1.

The driving unit 1 according to this embodiment is provided with a bracket 2, the reducer 3, a motor 4, and a driving power transmission mechanism 5, as shown in FIG. 2. A cylindrical input shaft 7 rotatable about the central axis E is provided on one end surface of the reducer 3 in a direction along the central axis (rotary axis) E of a columnar reducer body 6. On one end of the input shaft 7, a circular center gear (second transmission mechanism) 8 forming part of the driving power transmission mechanism 5 is provided. The reducer body 6, the input shaft 7, and the center gear 8 are provided with a hollow hole (second hollow hole) 9 penetrating through the reducer body 6, the input shaft 7, and the center gear 8 in the direction along the central axis E.

The bracket 2 accommodates the center gear 8 and is fixed to one end surface of the reducer 3. The bracket 2 is provided with a through-hole (first hollow hole) 10 communicating with the hollow hole 9 provided in the reducer body 6, the input shaft 7, and the center gear 8. The input shaft 7 of the reducer 3 is sealed by a sealing member 11 disposed between the input shaft 7 and the bracket 2 around the through-hole 10 so as to be rotatable about the central axis E.

The bracket 2 is provided with a through-hole 12 into which a shaft 4a of the motor 4 is inserted, and a motor attachment surface 13 onto which the motor 4 is fixed in a state in which the shaft 4a rotating about a rotary axis (axis) H is inserted into the through-hole 12. A driving gear (first transmission mechanism) 14 is fixed to the shaft 4a of the motor 4.

The driving power transmission mechanism 5 is provided with a center gear 8 provided in the input shaft 7 of the reducer 3, the driving gear 14 fixed to the shaft 4a of the motor 4, and a driving shaft 18 in which intermediate gears (first transmission mechanism, second transmission mechanism) 15, 16 meshing with the center gear 8 and the driving gear 14, respectively, are connected with each other by a shaft 17. The driving shaft 18 is attached in a space formed in the bracket 2 so as to be rotatable about an axis G of the shaft 17. The center gear 8, the intermediate gears 15, 16, and the driving gear 14 are, for example, spur gears.

When one end surface of the reducer 3 is fixed to the bracket 2, the center gear 8 provided in the input shaft 7 of the reducer 3 and the intermediate gear 16 on one side of the driving shaft 18 in the bracket 2 mesh with each other. At this time, part of the space in the bracket 2 is sealed by the reducer 3, and a space between the through-hole 10 and the input shaft 7 is sealed by the sealing member 11.

When the motor 4 is attached to the motor attachment surface 13 of the bracket 2, the driving gear 14 fixed to the shaft 4a of the motor 4 and the intermediate gear 15 on the other side of the driving shaft 18 in the bracket 2 mesh with each other, and the through-hole 12 is sealed by the motor 4. Accordingly, the space in the bracket 2, in which the driving power transmission mechanism 5 is accommodated, is sealed. The sealed space is filled with a lubricant such as a grease, whereby the driving power transmission mechanism 5 is lubricated.

In the driving unit 1 according to this embodiment, the driving shaft 18 in which the intermediate gear 16 on one side meshes with the center gear 8 is disposed at a position offset with respect to the central axis E of the reducer 3 by a dimension A1 in one radial direction. The shaft 4a of the motor 4 in which the driving gear 14 meshes with the intermediate gear 15 on the other side of the driving shaft 18 is offset with respect to the shaft 17 of the driving shaft 18 by a dimension A2 in a direction approaching the central axis E of the reducer 3. Accordingly, a distance A3 between the rotary axis H of the shaft 4a of the motor 4 and the central axis E of the reducer 3 is shorter than the distance A1 between the axis G of the shaft 17 of the driving shaft 18 and the central axis E of the reducer 3.

Figure 3:
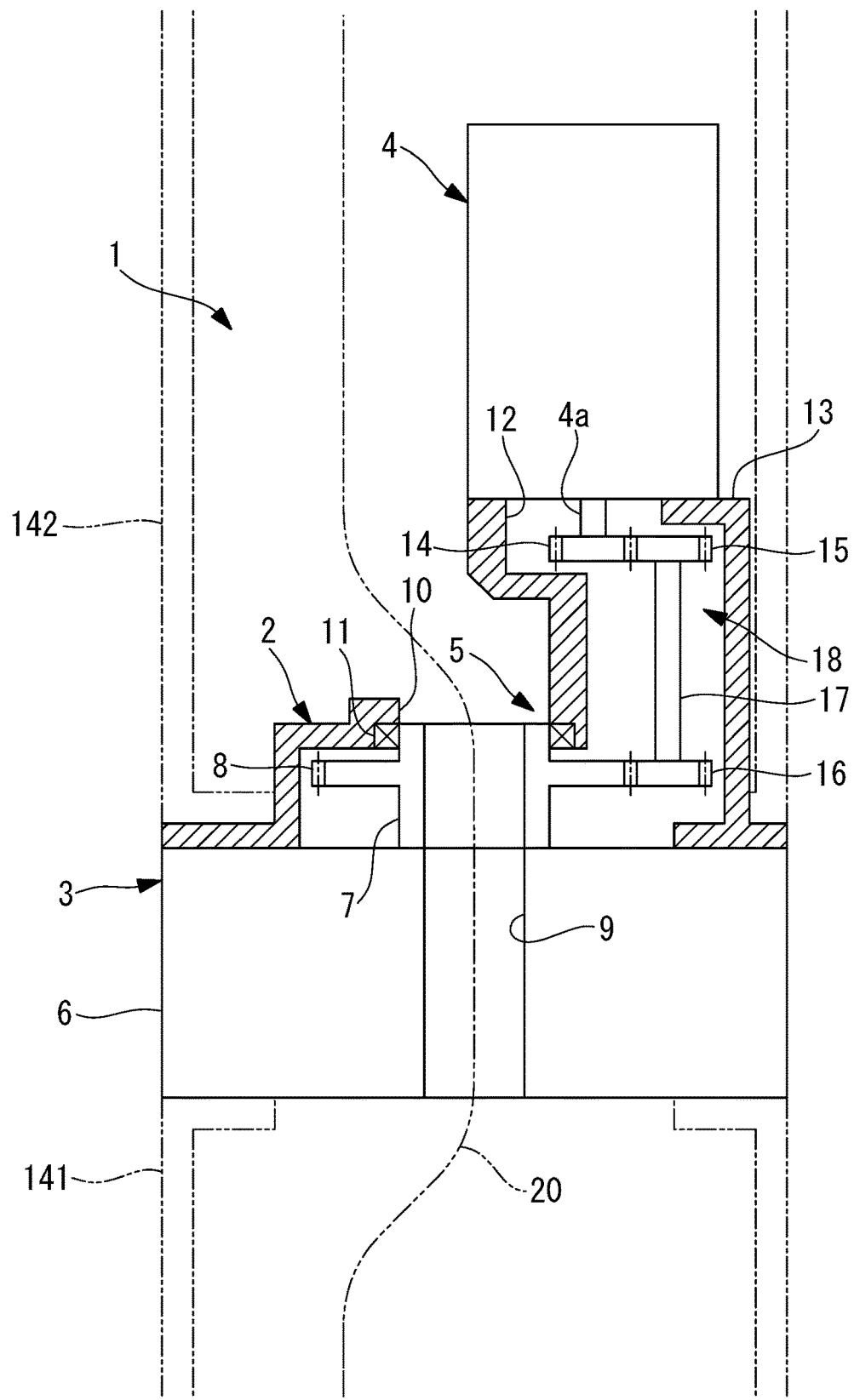
FIG. 3 is a vertical sectional view illustrating a robot arm with the driving unit in FIG. 1 mounted thereon.

In the driving unit 1, as shown in FIG. 3, the first wrist shaft casing 142 is detachably attached to the bracket 2 in a state in which the bracket 2 and the motor 4 are accommodated in the cylindrical first wrist shaft casing 142. The cylindrical second arm base part 141 is detachably attached to an end surface of the driving unit 1 on the side opposite to the bracket 2 with the reducer 3 therebetween.

Accordingly, the space in the second arm base part 141 communicates with the space in the first wrist shaft casing 142 via the hollow hole 9 that penetrates through the reducer body 6, the input shaft 7, and the center gear 8, and the through-hole 10 formed in the bracket 2. By using this through-hole 10, in the vicinity of the fourth axis D of the first wrist shaft casing 142 with respect to the second arm base part 141, it is possible to route a wire 20 from the inside of the second arm base part 141 to the inside of the first wrist shaft casing 142, as shown by the dashed line in FIG. 3.

With the thus-configured robot arm driving unit 1 according to this embodiment, when the motor 4 is driven, a driving force is input to the reducer 3 via the driving gear 14, the driving shaft 18, the center gear 8, and the input shaft 7. This makes it possible to rotationally drive the first wrist shaft casing 142 with respect to the second arm base part 141 about the central axis E that coincides with the fourth axis D at a rotation speed reduced by the reducer 3.

In this case, since the wire 20 is routed along the hollow hole 9 including the central axis E, it is possible to sufficiently reduce the load on the wire 20 when the first wrist shaft casing 142 is rotated with respect to the second arm base part 141 about the central axis E. In addition, in this embodiment, by employing the driving shaft 18, the shaft 4a of the motor 4 is disposed at a position closer to the central axis E of the reducer 3 than the driving shaft 18 is.

Figure 4:
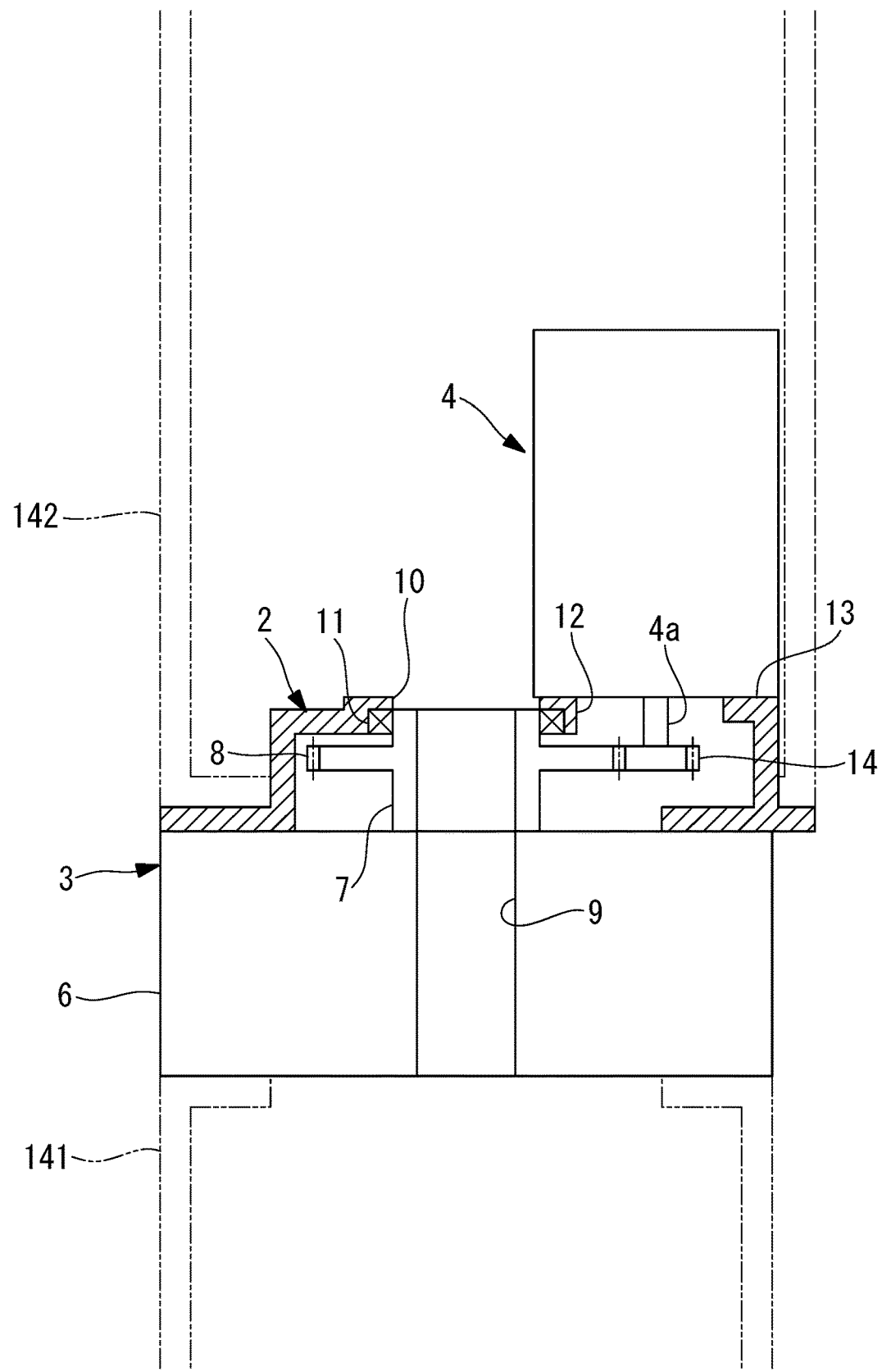
FIG. 4 is a vertical sectional view illustrating a comparative example of the robot arm driving unit in which a driving shaft is not included.

As a result, it is possible to significantly reduce the offset amount of the motor 4 with respect to the central axis E of the reducer 3 compared with a case in which the driving gear 14 attached to the shaft 4a of the motor 4 is directly meshed with the center gear 8, as shown in FIG. 4. That is, by reducing the offset amount of the motor 4, there is an advantage in that it is possible to sufficiently reduce the outer diameter dimension of the first wrist shaft casing 142 that accommodates the motor 4, and, for example, set the outer diameter dimension of the first wrist shaft casing 142 to be substantially the same as the outer diameter dimension of the reducer 3 as shown in FIG. 3.

In this embodiment, since each of the center gear 8, the driving gear 14, and the intermediate gears 15, 16 of the driving shaft 18 is formed of a spur gear, it is possible to arrange the axis G of the driving shaft 18 and the rotary axis H of the shaft 4a of the motor 4 parallel to the central axis E of the reducer 3. Accordingly, the motor 4 accommodated in the first wrist shaft casing 142 is disposed along the inner surface of the first wrist shaft casing 142 without being inclined with respect to the longitudinal axis of the first wrist shaft casing 142. As a result, there is an advantage in that it is possible to leave a sufficiently large space in the first wrist shaft casing 142 and easily perform the task of routing the wire 20, the installation of other components, etc.

Figure 5:
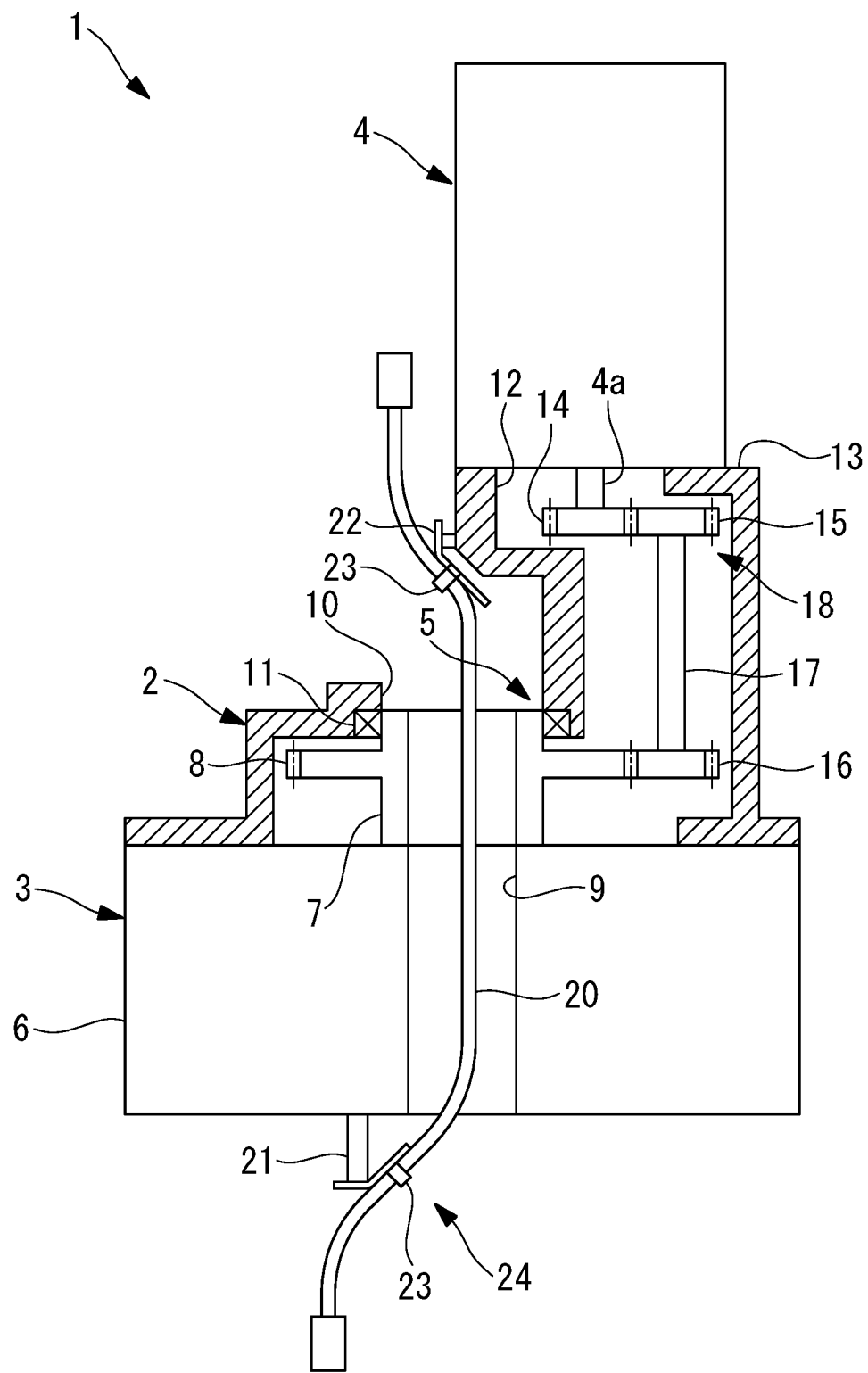
FIG. 5 is a vertical sectional view illustrating a modification of the driving unit in FIG. 2 in which the driving unit includes a cable.

In this embodiment, as shown in FIG. 5, fixation members (first fixation member, second fixation member) 21, 22 may be attached to an end surface of the reducer 3 and the bracket 2, and, for example, an attachment unit 24 in which the wire 20 such as a cable is fixed to the fixation members 21, 22 by means of fastening implements 23 such as nylon bands may be employed. That is, the attachment unit 24, in a state in which the wire 20 is attached thereto, may be employed.

This makes it possible to perform the assembly work of the wire 20 before the second arm base part 141 and the first wrist shaft casing 142 are attached. It is possible to easily perform the assembly work in a larger space compared with a case in which the assembly work is performed after the second arm base part 141 and the first wrist shaft casing 142 are attached. There is an advantage in that it is possible to maintain the attachment unit 24 as a whole, including the state of the wire 20.

As shown in FIG. 5, if both ends of the wire 20 included in the attachment unit 24 are to be connected with other wires by means of connectors, etc., the routing task after attaching the second arm base part 141 and the first wrist shaft casing 142 will be easy. The fixation member 22 may be attached to the motor 4 instead of the bracket 2.

In this embodiment, although a case in which the bracket 2 and the motor 4 are accommodated in the first wrist shaft casing 142 has been described, the bracket 2 and the motor 4 may also be accommodated in the second arm base part 141.

In this embodiment, although a configuration in which the driving gear 14 and the intermediate gear 15 are employed as a first transmission mechanism, and the intermediate gear 16 and the center gear 8 are employed as the second transmission mechanism has been described as an example, instead of this configuration, a configuration in which at least one of the first transmission mechanism and the second transmission mechanism is a pair of pulleys and a belt stretched over the pulleys may be employed. One of the first transmission mechanism and the second transmission mechanism may be a pair of gears, and the other of the first transmission mechanism and the second transmission mechanism may be a pair of pulleys and a belt stretched over the pulleys.

Figure 6:
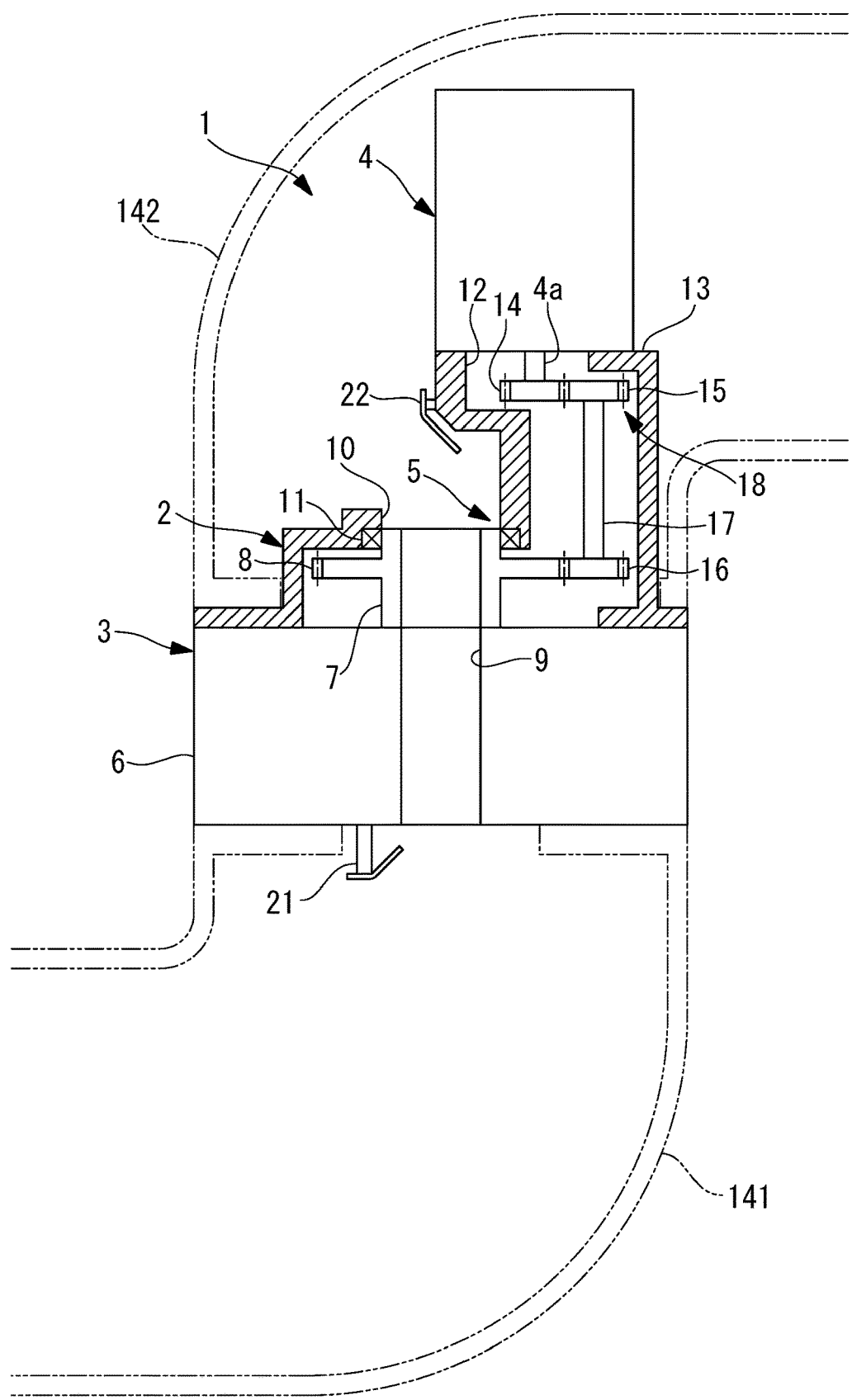
FIG. 6 is a vertical sectional view illustrating a modification of the robot arm with the driving unit in FIG. 1 mounted thereon.

In this embodiment, although a case in which the first wrist shaft casing 142 serving as a first member and the second arm base part 141 serving as a second member have a cylindrical shape has been described as an example, other hollow shapes may be employed instead of this shape, as shown in FIG. 6.

The invention claimed is:

1. A driving unit that rotates a first member and a second member constituting a robot arm about a rotary axis, the driving unit comprising:
   a bracket fixed to the first member and including a first hollow hole penetrating along the rotary axis;
   a motor fixed to the bracket and accommodated in the first member;
   a reducer configured to connect the bracket and the second member such that the bracket and the second member are rotatable about the rotary axis, wherein a second hollow hole penetrates through the reducer along the rotary axis;
   a wire penetrating through the first hollow hole and the second hollow hole and routed from an inside of the first member to an inside of the second member;
   a first fixation member that fixes the wire to the bracket or the motor in the first member;
   a second fixation member that fixes the wire to the reducer in the second member; and
   a driving power transmission mechanism accommodated in the bracket and transmitting a rotation of the motor to the reducer, wherein the driving power transmission mechanism includes a driving shaft, a first transmission mechanism that transmits the rotation of the motor to the driving shaft, and a second transmission mechanism that transmits a rotation of the driving shaft to an input shaft of the reducer, and a distance between a shaft of the motor and the rotary axis is shorter than a distance between the driving shaft and the rotary axis.

2. The robot driving unit according to claim 1, wherein at least one of the first transmission mechanism and the second transmission mechanism is a pair of gears.

3. The robot driving unit according to claim 1, wherein at least one of the first transmission mechanism and the second transmission mechanism is a pair of pulleys and a belt stretched over the pair of pulleys.

4. The robot arm driving unit according to claim 1, wherein the rotary axis and an axis of the shaft of the motor are parallel to each other.

5. The robot arm driving unit according to claim 1, wherein the first hollow hole communicates with the second hollow hole.

6. The robot arm driving unit according to claim 1, wherein a space in the second member communicates with a space in the first member via the second hollow hole and the first hollow hole.

* * * * *